US010551275B2

United States Patent
Hotta et al.

(10) Patent No.: US 10,551,275 B2
(45) Date of Patent: Feb. 4, 2020

(54) CAM ANGLE SENSOR FAULT DIAGNOSIS APPARATUS FOR STRADDLED VEHICLE, ENGINE SYSTEM, AND STRADDLED VEHICLE

(71) Applicants: DENSO CORPORATION, Kariya-shi, Aichi (JP); YAMAHA HATSUDOKI KABUSHIKI KAISHA, Iwata-shi, Shizuoka-ken (JP)

(72) Inventors: Minoru Hotta, Kariya (JP); Yoshihiko Nonogaki, Kariya (JP); Naoki Nagata, Kariya (JP); Daisuke Nonaka, Iwata (JP); Yoko Fujime, Iwata (JP)

(73) Assignees: DENSO CORPORATION, Kariya-Shi, Aichi (JP); YAMAHA HATSUDOKI KABUSHIKI KAISHA, Iwata-Shi, Shizuoka-Ken (JP)

(*) Notice: Subject to any disclaimer, the term of this patent is extended or adjusted under 35 U.S.C. 154(b) by 0 days.

(21) Appl. No.: 15/953,123

(22) Filed: Apr. 13, 2018

(65) Prior Publication Data
US 2018/0231434 A1 Aug. 16, 2018

Related U.S. Application Data

(63) Continuation-in-part of application No. PCT/JP2016/079462, filed on Oct. 4, 2016.

(30) Foreign Application Priority Data

Oct. 13, 2015 (JP) ................................ 2015-202212

(51) Int. Cl.
*G01M 15/04* (2006.01)
*F01L 1/34* (2006.01)
(Continued)

(52) U.S. Cl.
CPC ............ *G01M 15/046* (2013.01); *B62M 7/02* (2013.01); *F01L 1/34* (2013.01); *F02D 41/222* (2013.01);
(Continued)

(58) Field of Classification Search
CPC ...... G01M 15/046; B62M 7/02; F02F 41/222; F02D 45/00; F02D 35/0007;
(Continued)

(56) References Cited

U.S. PATENT DOCUMENTS 5,896,839 A 4/1999 Togai
2005/0010339 A1* 1/2005 Matsuda ............... B63B 35/731
701/21
(Continued)

FOREIGN PATENT DOCUMENTS

EP 2080872 A2 7/2009
EP 2 518 451 A1 10/2012
(Continued)

*Primary Examiner* — McDieunel Marc
(74) *Attorney, Agent, or Firm* — Rabin & Berdo, P.C.

(57) ABSTRACT

The present teaching aims to provide: a cam angle sensor fault diagnosis apparatus for straddled vehicle, capable of detecting a fault of a cam angle sensor installed in a straddled vehicle and guessing a fault place; an engine system; and a straddled vehicle. A cam angle sensor fault diagnosis apparatus for straddled vehicle includes: a cam signal receiving unit connected to a signal output line through which a cam angle sensor outputs a cam signal in accordance with the rotation angle, the cam signal receiving unit being configured to receive a cam signal via the signal output line; a state determination unit that determines one or two fault states of the cam angle sensor from a disconnection state, a power supply fault state, and a ground fault state, distinguishably from the other fault states, in accordance with a signal level of a cam signal received by the cam signal receiving unit; and a signal output unit that outputs a fault signal representing the one or two fault states determined by the state determination unit, in such a manner that the fault signal representing the one or two fault states is different from a fault signal representing the other fault states.

10 Claims, 11 Drawing Sheets

(51) Int. Cl.
  *F02D 45/00* (2006.01)
  *F02D 41/22* (2006.01)
  *B62M 7/02* (2006.01)
  *F02D 35/00* (2006.01)

(52) U.S. Cl.
  CPC .......... *F02D 45/00* (2013.01); *F02D 35/0007* (2013.01); *F02D 2200/10* (2013.01); *Y02T 10/40* (2013.01)

(58) Field of Classification Search
  CPC ...... F02D 2200/10; F02D 11/10; Y02T 10/40; B60L 50/10; B63B 35/31; B63B 35/731
  See application file for complete search history.

(56) References Cited

U.S. PATENT DOCUMENTS

| | | | |
|---|---|---|---|
| 2006/0040570 A1* | 2/2006 | Tsumiyama | B63B 35/731 440/2 |
| 2007/0060444 A1* | 3/2007 | Kawamura | F02D 11/10 477/107 |
| 2017/0256106 A1* | 9/2017 | Hino | B60L 50/10 |

FOREIGN PATENT DOCUMENTS

| | | |
|---|---|---|
| JP | 2000-283010 A | 10/2000 |
| JP | 2003-113734 A | 4/2003 |
| JP | 2010-106684 A | 5/2010 |
| JP | 4948831 B2 | 6/2012 |
| JP | 2013-029052 A | 2/2013 |
| TW | 201107586 A | 3/2011 |
| TW | 201502362 A | 1/2015 |

* cited by examiner

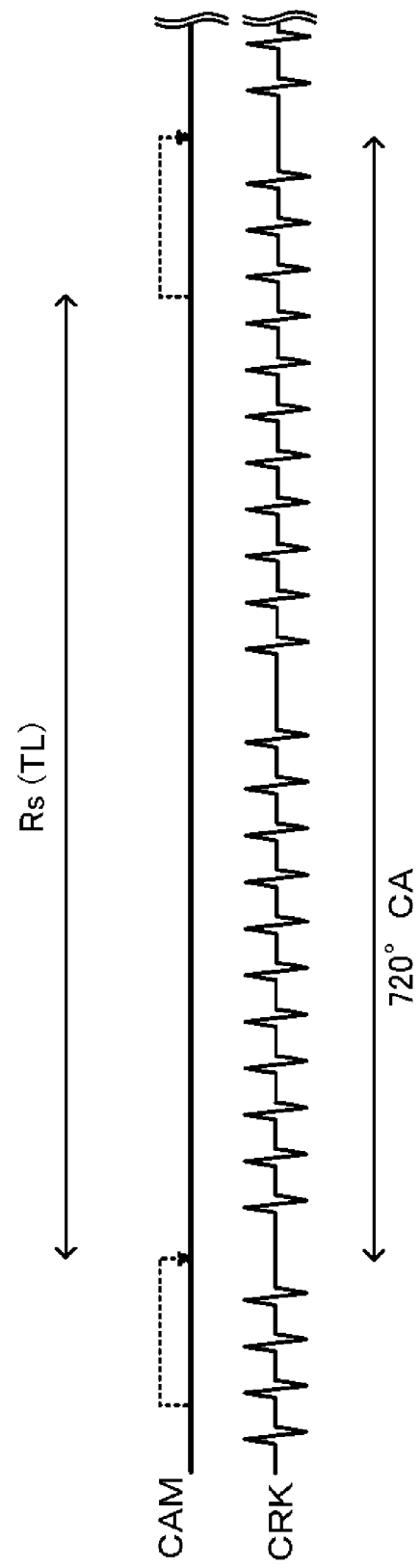

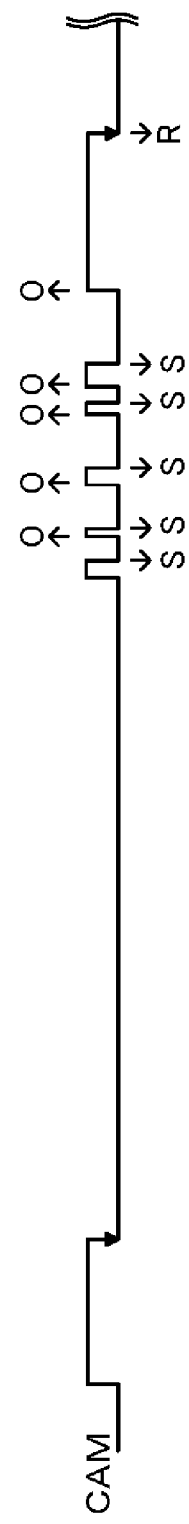

CAM ANGLE SENSOR FAULT DIAGNOSIS APPARATUS FOR STRADDLED VEHICLE, ENGINE SYSTEM, AND STRADDLED VEHICLE

TECHNICAL FIELD

The present teaching relates to a cam angle sensor fault diagnosis apparatus for straddled vehicle, an engine system, and a straddled vehicle.

BACKGROUND ART

As an example of straddled vehicles, a motorcycle is shown in Patent Literature 1 (PTL 1). The motorcycle of Patent Literature 1 is provided with an engine held on a main body frame. The motorcycle is also provided with electrical components such as a cam sensor and an ECU.

CITATION LIST

Patent Literature

PTL 1: Japanese Patent No. 4948831 (FIG. 1 and FIG. 2)

SUMMARY OF INVENTION

Technical Problem

Some of the electrical components of the straddled vehicle as shown in Patent Literature 1 are attached to the engine. Some others of the electrical components are attached to the main body frame. The electrical components of the straddled vehicle as shown in Patent Literature 1 are normally covered with, for example, a covering made of a resin.

In the straddled vehicle, a portion where the electrical component is attached may be exposed to water. For example, a high-pressure cleaner is sometimes used to wash the straddled vehicle. In a car wash using a high-pressure cleaner, a portion where the electrical component is attached may be exposed to water depending on a way of the car wash.

In general, waterproofness of an electrical component provided in a straddled vehicle is ensured by a covering or the like. It however may be conceivable that a moisture derived from water influences a function of the electrical component.

Electrical components provided in a straddled vehicle are electrically connected to one another. Thus, there may be a possibility that a function fault in one component influences a wide range. In other words, when a fault of a certain function is found, a wide range of places can be assumed as a cause of the fault. It therefore is expected that a time is taken to identify where in the electrical components provided in the straddled vehicle needs to be repaired or replaced. As a result, it is expected that a time is taken to eliminate the function fault.

In the straddled vehicle, therefore, it would be preferable not only to detect the presence or absence of a function fault in electrical components but also to guess a place of the fault.

Among the electrical components, a cam angle sensor is provided near the upper end of the engine. The cam angle sensor would be likely to be influenced by a moisture, and likely to cause a function fault. For the cam angle sensor, not only detecting a function fault but also guessing a fault place would be preferable.

An object of the present teaching is to provide: a cam angle sensor fault diagnosis apparatus for straddled vehicle, capable of detecting a fault of a cam angle sensor installed in a straddled vehicle and guessing a fault place; an engine system; and a straddled vehicle.

Solution to Problem

To solve the problems described above, the present teaching adopts the following configurations.

(1) A cam angle sensor fault diagnosis apparatus for straddled vehicle, configured to detect a fault of a cam angle sensor that detects a rotation angle of a camshaft provided in an engine of a straddled vehicle, the cam angle sensor fault diagnosis apparatus for straddled vehicle including:

a cam signal receiving unit connected to a signal output line through which the cam angle sensor outputs a cam signal in accordance with the rotation angle, the cam signal receiving unit being configured to receive a cam signal via the signal output line;

a state determination unit that determines one or two fault states of the cam angle sensor from a disconnection state, a power supply fault state, and a ground fault state, distinguishably from the other fault states, in accordance with a signal level of a cam signal received by the cam signal receiving unit; and a signal output unit that outputs a fault signal representing the one or two fault states determined by the state determination unit, in such a manner that the fault signal representing the one or two fault states is different from a fault signal representing the other fault states.

In the cam angle sensor fault diagnosis apparatus for straddled vehicle of (1), the cam signal receiving unit receives the cam signal from the cam angle sensor via the signal output line. The state determination unit determines at least one fault state from the disconnection state, the power supply fault state, and the ground fault state, distinguishably from the other fault states, in accordance with the signal level of the cam signal. Thus, a fault of the cam angle sensor installed in the straddled vehicle is detected. In addition, the fault state is distinguishably determined. It is possible to narrow down where a cause of a function fault of the cam angle sensor is, by referring to fault information which is based on the fault signal representing the fault state. Here, the fault information is outputted by, for example, a device that is wired or wireless communicably connected to the cam angle sensor fault diagnosis apparatus for straddled vehicle. The device is, for example, configured to output the fault information based on the fault signal received from the signal output unit of the cam angle sensor fault diagnosis apparatus for straddled vehicle. The fault information outputted by the device is recognized by a user or the like.

As described above, the cam angle sensor fault diagnosis apparatus for straddled vehicle of (1) can detect a fault of the cam angle sensor installed in the straddled vehicle, and also can guess a fault place.

(2) The cam angle sensor fault diagnosis apparatus for straddled vehicle of (1), wherein the state determination unit determines one or two fault states of the cam angle sensor from a disconnection state, a power supply fault state, and a ground fault state, distinguishably from the other fault states, in accordance with a signal level of a cam signal received by the cam signal receiving unit and an excess of a holding period in which the signal level is held over a reference period defined for each of the signal levels.

In the configuration of (2), the fault states are distinguished from each other in accordance with the signal level of the cam signal and the excess of the holding period in which the signal level is held over the reference period defined for each of the signal levels. Accordingly, detection of a fault and guessing of a fault place can be made without the need to separately provided a special device for determining a fault state.

(3) The cam angle sensor fault diagnosis apparatus for straddled vehicle of (2), wherein the camshaft is provided with a main detection object and a sub detection object, the main detection object being detected by the cam angle sensor in a main reference period corresponding to a period equal to or shorter than 360 crank angle degrees out of 720 crank angle degrees of the engine, the sub detection object being detected by the cam angle sensor in a sub reference period corresponding to a period equal to or longer than 360 crank angle degrees out of the 720 crank angle degrees, and in a case either where a holding period in which a signal level representing the main detection object is held is at least longer than the main reference period, or where a holding period in which a signal level representing the sub detection object is held is at least longer than the sub reference period, the state determination unit determines one or two fault states of the cam angle sensor from a disconnection state, a power supply fault state, and a ground fault state, distinguishably from the other fault states.

In the configuration of (3), a fault state is determined in a case where the holding period in which the signal level representing the main detection object is held is at least longer than the main reference period, or in a case where the holding period in which the signal level representing the sub detection object is held is at least longer than the sub reference period. Here, the main reference period corresponds a period equal to or shorter than 360 crank angle degrees. The sub reference period corresponds to a period equal to or longer than 360 crank angle degrees. This enables a fault state to be determined in an appropriate period in accordance with arrangement of the main detection object or arrangement of the sub detection object. Accordingly, a time for determining a fault state can be shortened to the appropriate period in accordance with arrangement of the main detection object or arrangement of the sub detection object.

(4) The cam angle sensor fault diagnosis apparatus for straddled vehicle of (3), wherein in a case either where a holding period in which a signal level representing the main detection object is held is at least longer than the main reference period, or where a holding period in which a signal level representing the sub detection object is held is at least longer than the sub reference period, the state determination unit determines one or two fault states of the cam angle sensor from a disconnection state, a power supply fault state, and a ground fault state, distinguishably from the other fault states, and in a case where a signal level of the cam signal has changed twice or more in a period that is at least shorter than the main reference period, the state determination unit determines one or two fault states of the cam angle sensor from a disconnection state, a power supply fault state, and a ground fault state, distinguishably from the other fault states.

A fault state of the cam angle sensor includes a state where the phenomenon of a fault emerges steadily and a state where the phenomenon of a fault emerges intermittently. A case where the phenomenon emerges intermittently includes, for example, a defective isolation and a defective contact. The phenomenon of an intermittent fault is likely to emerge in advance of a steady fault. In the configuration of (4), the state determination unit performs a determination also when the signal level has changed twice or more in the period that is at least shorter than the main reference period. Accordingly, the configuration of (4) can detect a fault state of the cam angle sensor at an early stage, and also can guess a fault place at an early stage.

(5) The cam angle sensor fault diagnosis apparatus for straddled vehicle of any one of (2) to (4), wherein the state determination unit measures a holding period in which the signal level is held based on a signal that corresponds to a rotation cycle of a crankshaft of the engine and that changes with a cycle equal to or shorter than a rotation cycle of the camshaft as a reference.

In the configuration of (5), the holding period in which the signal level is held is measured based on the signal that corresponds to the rotation cycle of the crankshaft of the engine and that changes with a cycle equal to or shorter than the rotation cycle of the camshaft as a reference. Accordingly, detection of a fault of the cam angle sensor and a determination of a fault state can be performed precisely.

(6) The cam angle sensor fault diagnosis apparatus for straddled vehicle of (5), wherein the state determination unit measures a holding period in which the signal level is held based on an output signal of a crank angle sensor that detects a rotation angle of the crankshaft as a reference.

The crank angle sensor is used for a combustion control in the engine. In the configuration of (5), the holding period in which the signal level is held is measured based on the output signal of the crank angle sensor as a reference. That is, the output signal of the crank angle sensor is usable for the detection of a fault of the cam angle sensor and the determination of a fault state. Thus, a configuration for measuring the holding period based on the crank angle as a reference is simple.

(7) The cam angle sensor fault diagnosis apparatus for straddled vehicle of (5), wherein the state determination unit measures a holding period in which the signal level is held based on an output signal of an intake pressure sensor that detects an intake pressure of the engine as a reference.

In the configuration of (7), the holding period in which the signal level is held is measured based on the output signal of the intake pressure sensor as a reference. That is, the output signal of the intake pressure sensor is usable for the detection of a fault of the cam angle sensor and the determination of a fault state. Thus, a configuration for measuring the holding period based on the crank angle as a reference is simple.

(8) The cam angle sensor fault diagnosis apparatus for straddled vehicle of any one of (1) to (7), wherein when the cam angle sensor is not in any of a disconnection state, a power supply fault state, and a ground fault state, the cam signal receiving unit receives the cam signal from the cam angle sensor such that a high signal level holding period in which a cam signal having a high signal level is received and a low signal level holding period in which a cam signal having a low signal level is received alternately and continuously appear and such that the sum of one high signal level holding period and one low signal level holding period that are continuous with each other substantially matches a period of 720 crank angle degrees in the engine or is shorter than the period of 720 crank angle degrees, in the high signal level holding period and the low signal level holding period that alternately and continuously appear, the state determination unit repeats a determination of a fault state based on the length of the high signal level holding period and a determination of a fault state based on the length of the low signal level holding period so as to satisfy all of requirements (i) to (iii) that: (i) a fault state determined based on the length of the high signal level holding period and a fault state determined based on the length of the low signal level holding period are different from each other; (ii) a fault state determined based on the length of the high signal level holding period is distinguished from a fault state other than the fault state determined based on the length of the high signal level holding period; and (iii) a fault state determined based on the length of the low signal level holding period is distinguished from a fault state other than the fault state determined based on the length of the low signal level holding period, and the signal output unit outputs the fault signal so as to satisfy all of requirements (I) to (III) that: (I) a fault signal representing a fault state determined based on the length of the high signal level holding period and a fault signal representing a fault state determined based on the length of the low signal level holding period are different from each other; (II) a fault signal representing a fault state determined based on the length of the high signal level holding period is distinguished from a fault signal representing a fault state other than the fault state determined based on the length of the high signal level holding period; and (III) a fault signal representing a fault state determined based on the length of the low signal level holding period is distinguished from a fault signal representing a fault state other than the fault state determined based on the length of the low signal level holding period.

In the configuration of (8), due to the high signal level holding period and the low level holding period that alternately and continuously appear, different fault states can be determined distinguishably. This makes it possible to detect a fault of the cam angle sensor, and also guess a fault place more promptly.

(9) An engine system installed in a straddled vehicle, the engine system including:

an engine;

a cam angle sensor that detects a rotation angle of a camshaft provided in the engine; and the cam angle sensor fault diagnosis apparatus for straddled vehicle of any one of (1) to (8).

The engine system of (9) enables a fault of the cam angle sensor to be detected, and also enables a fault place to be guessed.

(10) A straddled vehicle including the engine system of (9).

The straddled vehicle of (10) enables a fault of the cam angle sensor to be detected, and also enables a fault place to be guessed.

Advantageous Effects of Invention

The present teaching enables a fault of a cam angle sensor installed in a straddled vehicle to be detected, and also enables a fault place to be guessed.

BRIEF DESCRIPTION OF DRAWINGS

FIG. 9 (A) is a timing chart schematically showing a cam signal in an intermittent ground fault state; and (B) is a timing chart schematically showing a cam signal in an intermittent power supply fault state or disconnection state.

DESCRIPTION OF EMBODIMENTS

First Embodiment

Figure 1:
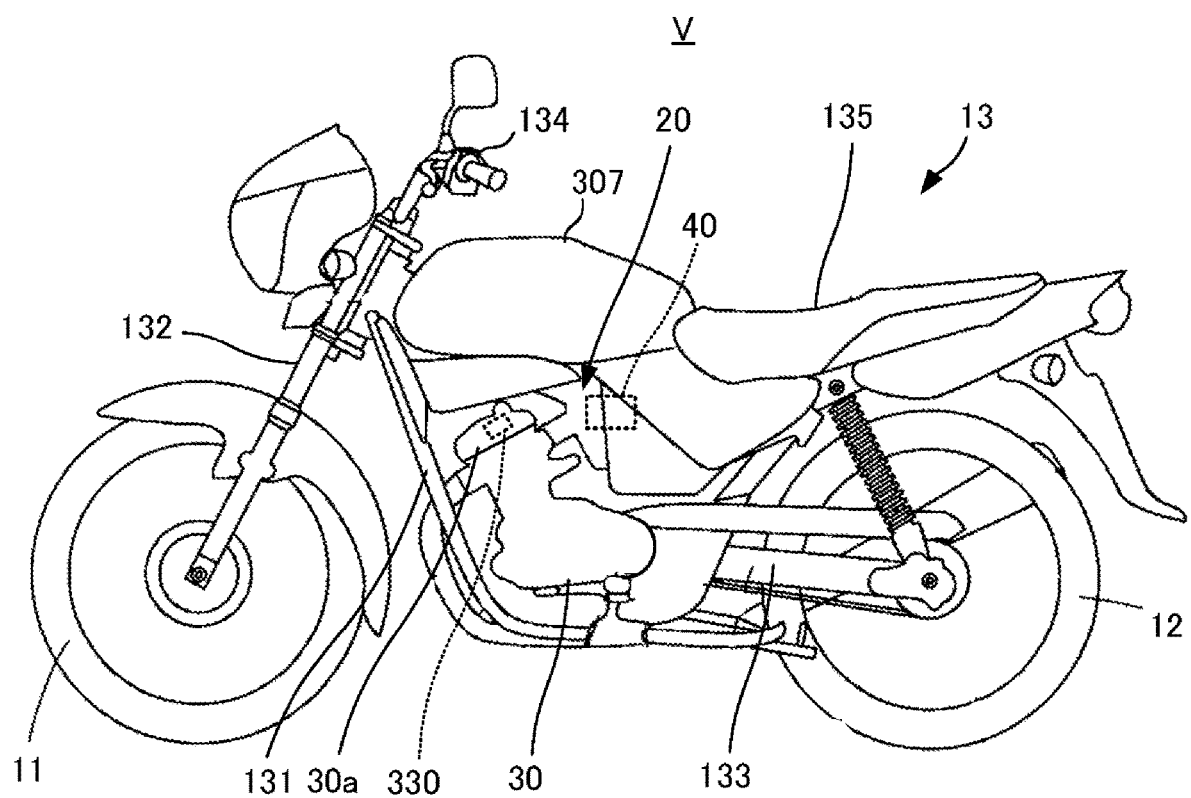
FIG. 1 A schematic diagram showing a straddled vehicle in which a cam angle sensor fault diagnosis apparatus for straddled vehicle according to a first embodiment of the present teaching is installed.

FIG. 1 is a schematic diagram showing a straddled vehicle in which a cam angle sensor fault diagnosis apparatus for straddled vehicle according to a first embodiment of the present teaching is installed.

A straddled vehicle V shown in FIG. 1 is a motorcycle. The straddled vehicle V includes wheels 11, 12, a vehicle body 13, and an engine system 20. The wheels 11, 12 and the engine system 20 are supported on the vehicle body 13. The wheels 11, 12 are rotatably supported on the vehicle body 13.

The vehicle body 13 includes a main body frame 131, a front fork 132, and a rear arm 133. The front fork 132 is rotatably supported on the main body frame 131. The front wheel 11 is supported on the front fork 132. The rear arm 133 is supported on the main body frame 131. The rear wheel 12 is supported on the rear arm 133.

The vehicle body 13 includes a handlebar 134 and a seat 135. The handlebar 134 is fixed to an upper portion of the front fork 132. A user of the straddled vehicle V is seated on the seat 135. The user manipulates the handlebar 134.

The engine system 20 supplies a driving force to the wheel 12. The engine system 20 rotationally drives the wheel 12. In this manner, the engine system 20 makes the straddled vehicle V travel. The engine system 20 includes an engine 30 and a cam angle sensor fault diagnosis apparatus 40 for straddled vehicle. Hereinafter, the cam angle sensor fault diagnosis apparatus 40 for straddled vehicle will be simply referred to as diagnosis apparatus 40.

The engine 30 supplies a driving force to the wheel 12. The engine 30 rotationally drives the wheel 12. In this manner, the engine 30 makes the straddled vehicle V travel. The engine 30 is supported on the vehicle body 13. The engine 30 is exposed to the outside of the straddled vehicle V.

The engine system 20 has sensors for detecting operations of the respective parts of the engine 30. The engine system 20 has a cam angle sensor 330. The cam angle sensor 330 is disposed in an upper portion of the engine 30. The engine 30 is provided with a covering 30a. The covering 30a covers the cam angle sensor 330.

Figure 2A:
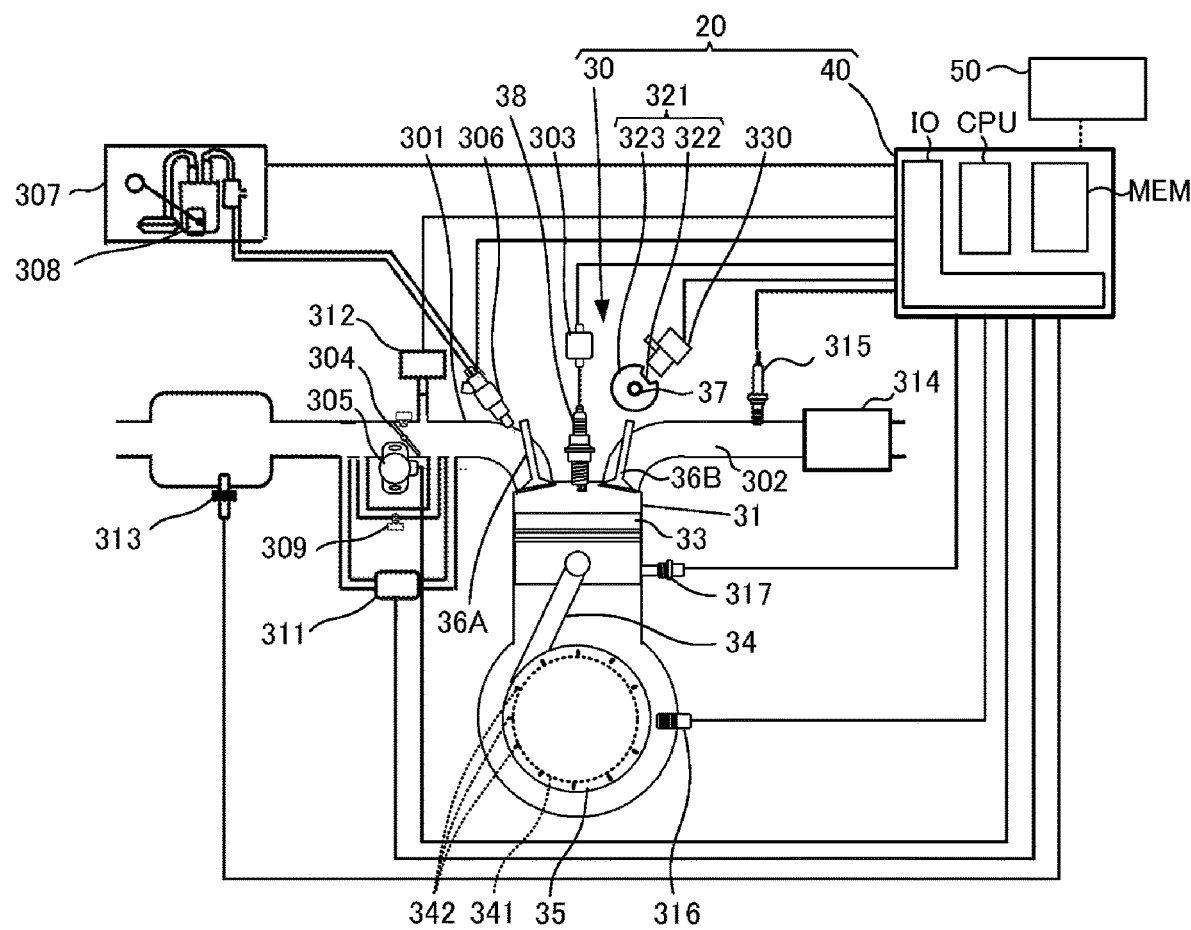
FIG. 2 (A) is a schematic diagram illustrating an engine system shown in FIG. 1; and (B) is a block diagram illustrating a configuration of the cam angle sensor fault diagnosis apparatus for the straddled vehicle.
Figure 2B:
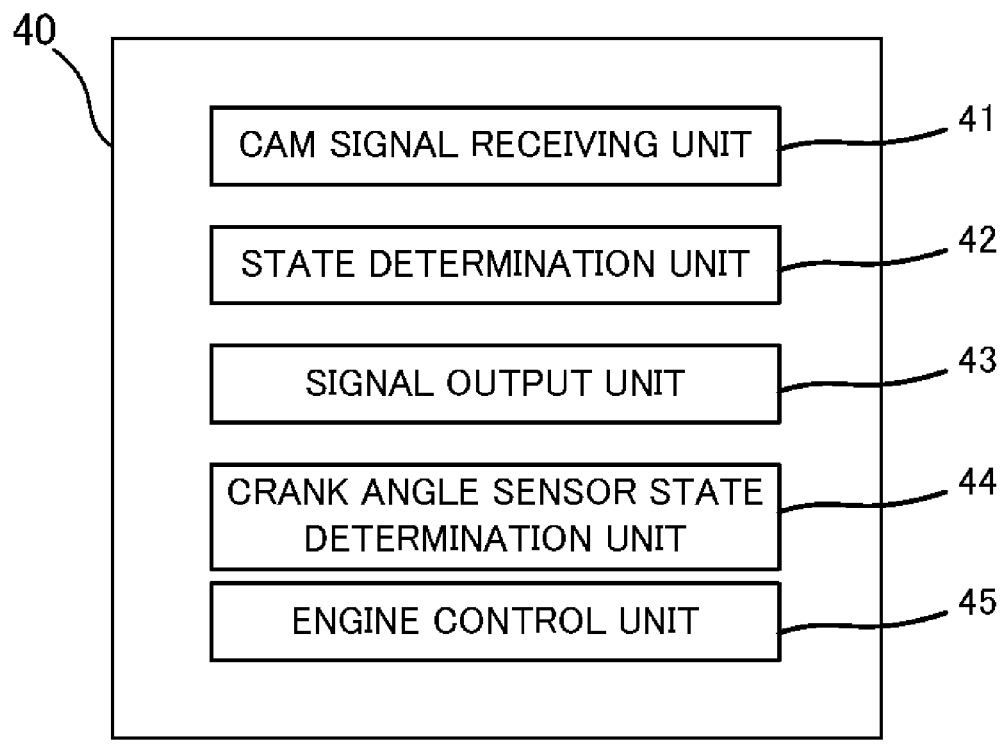

FIG. 2(A) is a schematic diagram illustrating the engine system 20 shown in FIG. 1. FIG. 2(B) is a block diagram showing a configuration of the cam angle sensor fault diagnosis apparatus 40 for straddled vehicle.

The engine 30 includes a cylinder 31, a piston 33, a connecting rod 34, a crankshaft (crank-shaft) 35, valves 36A, 36B, and a camshaft (cam-shaft) 37.

The piston 33 is disposed in the cylinder 31. The piston 33 is coupled to the crankshaft 35 via the connecting rod 34. A combustion chamber is formed in the cylinder 31. The engine 30 has a spark plug 38. The spark plug 38 is supplied with a high voltage from an ignition coil 303. The spark plug 38 spark-ignites a mixed gas in the combustion chamber.

FIG. 2(A) also shows peripheral devices around the engine 30.

To the engine 30, an intake passage 301 and an exhaust passage 302 are connected. In the intake passage 301, a throttle valve 304 is disposed. The throttle valve 304 is driven in accordance with the amount of operation performed on an accelerator operator (not shown). The throttle valve 304 is provided with a throttle position sensor 305. The throttle position sensor 305 detects the opening degree of the throttle valve 304. In the intake passage 301, an air bypass screw 309 and a high-speed idle controller 311 are also disposed.

The intake passage 301 is provided with a fuel injection device 306. The fuel injection device 306 injects a fuel into the intake passage 301. The fuel injection device 306 is connected to a fuel tank 307. The fuel tank 307 has a fuel pump 308. The fuel pump 308 supplies a fuel to the fuel injection device 306.

The intake passage 301 is provided with an intake pressure sensor 312. The intake pressure sensor 312 detects an intake pressure. The intake pressure sensor 312 detects a pressure in the intake passage 301. The intake passage 301 is also provided with an intake temperature sensor 313. The intake temperature sensor 313 detects a temperature in the intake passage 301.

In the exhaust passage 302, a catalyst device 314 is disposed. The exhaust passage 302 is provided with an oxygen concentration sensor 315. The oxygen concentration sensor 315 detects an oxygen concentration in an exhaust gas.

After passing through the throttle valve 304, air is mixed with a fuel injected from the fuel injection device 306, to form a mixed gas. The mixed gas is introduced to the combustion chamber. The mixed gas is ignited by the spark plug 38, to fire and combust. The combustion of the mixed gas causes the piston 33 to move to and fro. The to-and-fro movement of the piston 33 is transmitted to the crankshaft 35 through the connecting rod 34. The to-and-fro movement of the piston 33 is converted into a rotational movement of the crankshaft 35.

As a result of the combustion, an exhaust gas is generated. The exhaust gas is fed from the engine 30 to the catalyst device 314 through the exhaust passage 302. The exhaust gas is purified in the catalyst device 314.

The engine 30 is a four-stroke engine. The engine 30 has an intake stroke, a compression stroke, an expansion stroke, and an exhaust stroke. The engine 30 undergoes one cycle while the crankshaft 35 rotates twice, the one cycle including one intake stroke, one compression stroke, one expansion stroke, and one exhaust stroke.

The engine 30 has the camshaft 37. The crankshaft 35 is coupled to the camshaft 37 through a timing belt (not shown). The camshaft 37 is driven by the crankshaft 35. The camshaft 37 is rotated together with the crankshaft 35. The camshaft 37 is configured to rotate once while the crankshaft 35 rotates twice. That is, the camshaft 37 rotates through 360 degrees while the crankshaft 35 rotates through 720 degrees. The rotation speed of the camshaft 37 is ½ of the rotation speed of the crankshaft 35.

The exhaust valve 36B is driven by a cam (not shown) provided to the camshaft 37. Thus, the exhaust valve 36B is operated to open or close. The operation of the exhaust valve 36B is in synchronization with rotations of the crankshaft 35.

The engine 30 has another camshaft (not shown) different from the camshaft 37. Said another camshaft drives the intake valve 36A. The configuration of the engine 30 is not limited to this, and alternatively, a single camshaft may be shared by the intake valve 36A and the exhaust valve 36B. In such a configuration, the intake valve 36A and the exhaust valve 36B are driven respectively by a plurality of cams included in the single camshaft.

The camshaft 37 is provided with a detection object part 321 and the cam angle sensor 330.

The detection object part 321 rotates integrally with the camshaft 37. The rotation speed of the detection object part 321 is ½ of the rotation speed of the crankshaft 35. The detection object part 321 includes a plurality of portions arranged side by side in the circumferential direction and having different physical properties. For example, the detection object part 321 includes a main detection object 322 and a sub detection object 323 whose physical properties are different from each other. The detection object part 321 includes one main detection object 322 and one sub detection object 323. The detection object part 321 is a member in the shape of a disc centered on the camshaft 37. The distances from the center to the main detection object 322 and to the sub detection object 323 are different from each other. The main detection object 322 forms a recessed portion.

In an engine including a plurality of camshafts, it suffices that either one of the plurality of camshafts is provided with the detection object part 321 and the cam angle sensor 330. It however is also acceptable that the plurality of camshafts are provided with the detection object part 321 and the cam angle sensor 330.

The cam angle sensor 330 detects the rotation angle of the camshaft 37. The cam angle sensor 330 outputs a cam signal in accordance with the rotation angle of the camshaft 37. The cam angle sensor 330 is disposed at a position facing the circumference of the detection object part 321. The cam angle sensor 330 directly confronts the detection object part 321.

The cam angle sensor 330 distinguishably detects the main detection object 322 and the sub detection object 323. The cam angle sensor 330 uses a difference in the magnetic properties between the main detection object 322 and the sub detection object 323.

The detection object part 321 is made of a magnetic material. The distance between the main detection object 322 and the cam angle sensor 330 while the main detection object 322 is facing the cam angle sensor 330 is different from the distance between the sub detection object 323 and the cam angle sensor 330 while the sub detection object 323 is facing the cam angle sensor 330. That is, gaps formed between the cam angle sensor 330 and the main detection object 322 and between the cam angle sensor 330 and the sub detection object 323 are different from each other.

The cam angle sensor 330 includes a Hall IC and a permanent magnet (not shown). In the cam angle sensor 330, the magnetic resistor varies depending on a difference in the length of the gap to the cam angle sensor 330. The Hall IC (not shown) which detects a magnetic flux outputs a signal in accordance with the difference. The cam angle sensor 330 accordingly outputs a cam signal in accordance with the main detection object 322 and the sub detection object 323.

The intake pressure sensor 312 outputs a signal in accordance with the pressure in the intake passage 301. The pressure in the intake passage 301 in the intake stroke is lower than the pressure in the other strokes. Thus, the intake pressure sensor 312 detects the intake stroke distinguishably from the other strokes. The intake pressure sensor 312 outputs a signal representing the intake stroke. The intake stroke occurs once while the crankshaft 35 rotates twice. The intake pressure sensor 312 outputs a signal representing the intake stroke once while the crankshaft 35 rotates twice.

The engine 30 has a crank angle sensor 316. The crank angle sensor 316 detects the rotation angle of the crankshaft 35.

The crankshaft 35 is provided with a crank detection object 341. The crank detection object 341 rotates integrally with the crankshaft 35. The crank detection object 341 has, on its outer circumference, a plurality of protruding portions 342 protruding radially outward. The plurality of protruding portions 342 are made of a magnetic material. The plurality of protruding portions 342 are arranged side by side in the circumferential direction, at substantially regular intervals except one.

The crank angle sensor 316 is disposed at a position facing the crank detection object 341. The crank angle sensor 316 is a pick-up type sensor. The crank angle sensor 316 includes a permanent magnet and a coil (not shown). The crank angle sensor 316 outputs a signal in accordance with passing of the protruding portion 342 of the crank detection object 341. The crank angle sensor 316 accordingly outputs a signal representing the rotation angle of the crankshaft 35.

The engine 30 has an engine temperature sensor 317. The engine temperature sensor 317 detects the temperature of the engine 30.

The diagnosis apparatus 40 includes a central processing unit CPU, a storage unit, or memory (MEM), and an input/output unit IO. The central processing unit CPU, the storage unit MEM, and the input/output unit IO together make up a computer. The storage unit MEM stores programs and data. The central processing unit CPU executes the programs stored in the storage unit MEM. The input/output unit IO sends and receives signals to and from the outside of the diagnosis apparatus 40.

The input/output unit IO of the diagnosis apparatus 40 is connected to the intake pressure sensor 312, the cam angle sensor 330, the throttle position sensor 305, the engine temperature sensor 317, the intake temperature sensor 313, and the crank angle sensor 316. The input/output unit IO is also connected to the fuel pump 308, the fuel injection device 306, the ignition coil 303, and the high-speed idle controller 311.

The diagnosis apparatus 40 is communicably connected to a diagnosis display device 50. The diagnosis display device 50 is connected to the diagnosis apparatus 40 when the straddled vehicle V is inspected or repaired. The diagnosis display device 50 is connected to the diagnosis apparatus 40 via a connector (not shown). For example, the diagnosis display device 50 and the diagnosis apparatus 40 may be wireless-communicably connected to each other.

The diagnosis apparatus 40 detects a fault of the cam angle sensor 330. The diagnosis apparatus 40 of this embodiment controls the engine 30. That is, the diagnosis apparatus 40 functions as a control device of the engine 30. The diagnosis apparatus 40 detects a fault of components other than the cam angle sensor 330.

As shown in FIG. 2(B), the diagnosis apparatus 40 includes a cam signal receiving unit 41, a state determination unit 42, and a signal output unit 43. The diagnosis apparatus 40 also includes a crank angle sensor state determination unit 44. The diagnosis apparatus 40 includes an engine control unit 45.

The cam signal receiving unit 41 is constituted of the input/output unit IO and the central processing unit CPU which executes the programs stored in the storage unit MEM. The state determination unit 42, the signal output unit 43, the crank angle sensor state determination unit 44, and the engine control unit 45 are constituted of the central processing unit CPU which executes the programs stored in the storage unit MEM. The state determination unit 42 includes, for example, one or more chips, including the CPU, that are configured with logic circuitry so as to perform a signal comparison based on one or more signals input from sensors in the engine system 20.

The cam signal receiving unit 41 is electrically connected to the cam angle sensor 330 so as to receive signals from the cam angle sensor 330. The cam signal receiving unit 41 receives a cam signal from the cam angle sensor 330. The state determination unit 42 determines a fault state of the cam angle sensor 330 in accordance with a signal level of the cam signal received by the cam signal receiving unit 41.

The signal output unit 43 outputs a fault signal representing the fault state determined by the state determination unit 42. The signal output unit 43 outputs the fault signal to the diagnosis display device 50.

The crank angle sensor state determination unit 44 detects a fault of the crank angle sensor 316. The engine control unit 45 controls the engine 30. The engine control unit 45 also controls peripheral devices around the engine 30.

Figure 3:
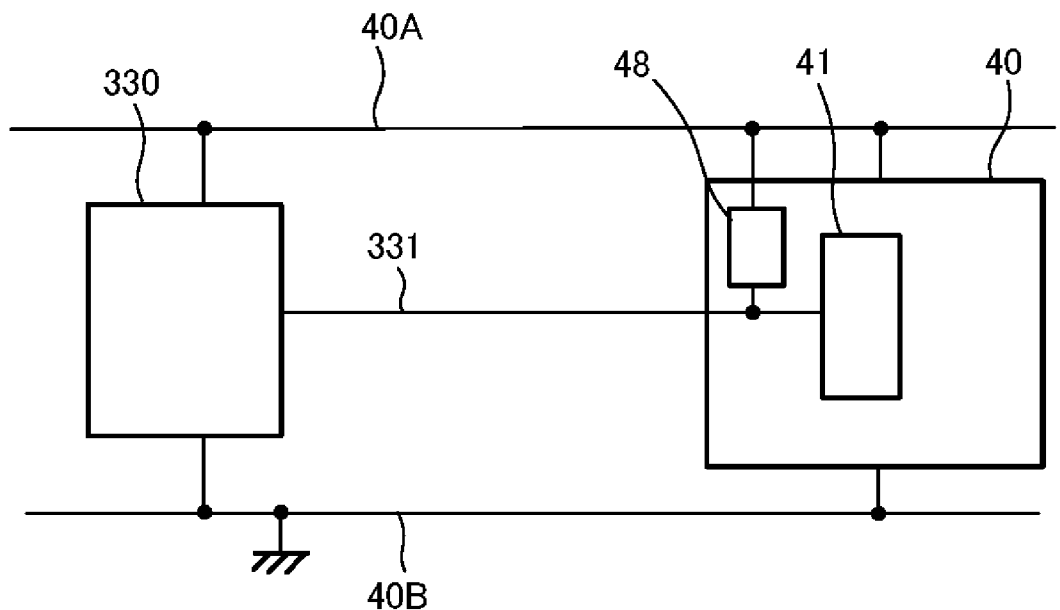
FIG. 3 A block diagram showing connection between a cam angle sensor and the diagnosis apparatus.

FIG. 3 is a block diagram showing connection between the cam angle sensor 330 and the diagnosis apparatus 40.

The cam angle sensor 330 outputs a cam signal via a signal output line 331. The cam signal is outputted in accordance with the rotation angle of the camshaft 37.

The cam signal receiving unit 41 of the diagnosis apparatus 40 is connected to the signal output line 331 of the cam angle sensor 330. The cam signal receiving unit 41 of the diagnosis apparatus 40 is connected to the cam angle sensor 330 via the signal output line 331. In more detail, the input/output unit IO constituting the cam signal receiving unit 41 is connected to the signal output line 331 of the cam angle sensor 330.

The diagnosis apparatus 40 receives power supply from power supply lines 40A, 40B. the power supply lines 40A, 40B supply power from a battery or a power supply device (not shown) mounted on the wheel 11 to the diagnosis apparatus 40.

The power supply lines 40A, 40B have a positive power supply line 40A and a negative power supply line 40B.

The negative power supply line 40B is grounded to the vehicle body 13. The vehicle body 13 of the straddled vehicle V shown in FIG. 1 may be used as the negative power supply line 40B. In such a case, the vehicle body 13 is a conductor. The negative power supply line 40B will be also referred to as ground line 40B. The negative power supply line 40B may be a lead wire different from the vehicle body 13.

The cam angle sensor 330 and the diagnosis apparatus 40 are connected to each other via the negative power supply line 40B. In this embodiment, the positive power supply line 40A is connected to the cam angle sensor 330, too. Thus, the cam angle sensor 330 is connected to the power supply lines 40A, 40B and to the signal output line 331.

The signal output line 331 and the power supply line 40A are connected via a resistor 48. The resistor 48 is provided between the signal output line 331 and the positive power supply line 40A. The resistor 48 is provided in the diagnosis apparatus 40. In a case where the cam angle sensor 330 has an output circuit of open-drain type or open-collector type, the resistor 48 drives the signal output line 331 to the voltage of the positive power supply line 40A. The resistor 48 shown in the drawing functions as a pull-up resistor. A signal of the signal output line 331 has a high level and a low level. The signal of the signal output line 331 is binary.

The cam angle sensor 330 may have an output circuit capable of outputting a high-level signal without the resistor 48. In this case as well, the resistor 48 is disposed between the signal output line 331 and the power supply line 40A. The resistor 48 may be provided outside the diagnosis apparatus 40. For example, the resistor 48 may be provided between the cam angle sensor 330 and the diagnosis apparatus 40. The resistor 48 is not limited to a resistor. The resistor 48 may be any component as long as the component has an electrical resistance.

The resistor 48 may be provided not between the signal output line 331 and the positive power supply line 40A but between the signal output line 331 and the negative power supply line 40B. That is, the resistor 48 may be a pull-down resistor.

The state of the cam angle sensor 330 includes a normal state and a fault state. The fault state includes multiple fault states corresponding to different types of faults, including a disconnection state, a power supply fault state, and a ground fault state. The normal state is a state in which the cam angle sensor 330 outputs cam signals that are in accordance with the main detection object 322 and the sub detection object 323, respectively. In the normal state, the cam signals include only signals that are in accordance with the main detection object 322 and the sub detection object 323.

The power supply fault state is a fault state in which the signal output line 331 of the cam angle sensor 330 is substantially conductive with the positive power supply line 40A irrespective of the positions of the main detection object 322 and the sub detection object 323. The power supply fault state includes a case where the signal output line 331 electrically conducts with the positive power supply line 40A as a result of a fault in an element or wiring built in the cam angle sensor 330. The power supply fault state also includes a case where the signal output line 331 disposed between the cam angle sensor 330 and the diagnosis apparatus 40 electrically conducts with the positive power supply line 40A.

The ground fault state is a fault state in which the signal output line 331 of the cam angle sensor 330 is substantially conductive with the negative power supply line 40B irrespective of the positions of the main detection object 322 and the sub detection object 323. The ground fault state includes a case where the signal output line 331 electrically conducts with the negative power supply line 40B as a result of a fault in an element or wiring built in the cam angle sensor 330. The ground fault state also includes a case where the signal output line 331 disposed between the cam angle sensor 330 and the diagnosis apparatus 40 electrically conducts with the negative power supply line 40B.

The disconnection state is a state in which the signal output line 331 is electrically disconnected before reaching the diagnosis apparatus 40. The disconnection state includes, for example, a state in which a defective conduction occurs between an element built in the cam angle sensor 330 and a wire material constituting the signal output line 331. In the configuration shown in FIG. 3, the signal output line 331 is connected to the positive power supply line 40A via the resistor 48. In this case, the level of the signal output line 331 in the disconnection state is substantially equal to the level of the positive power supply line 40A. The level of the signal output line 331 in the disconnection state is a high signal level.

Figure 4:
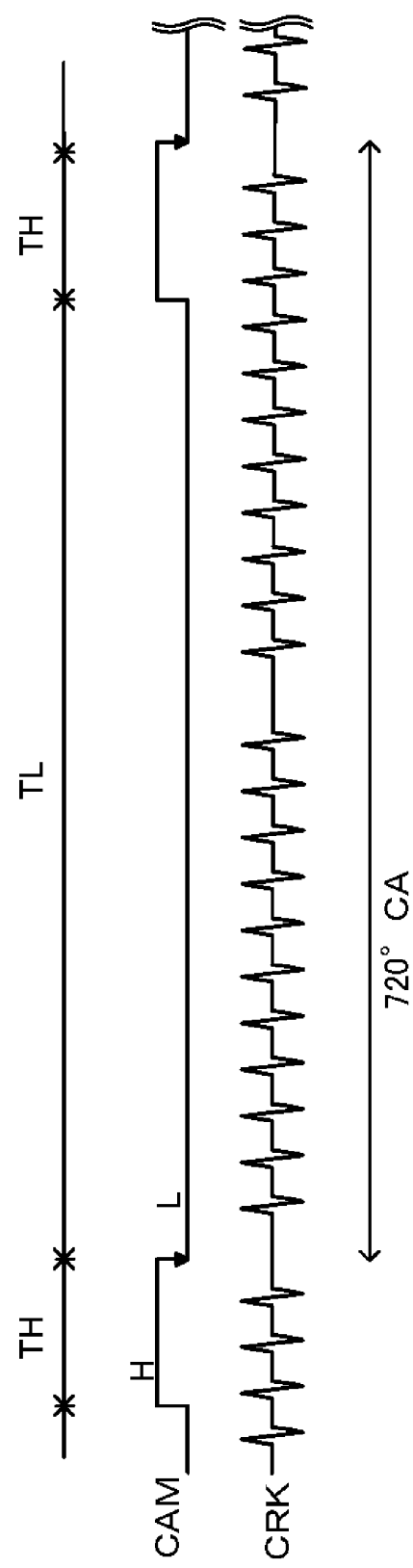
FIG. 4 A timing chart showing a cam signal that a cam signal receiving unit receives from the cam angle sensor in a normal state.

FIG. 4 is a timing chart showing a cam signal CAM that the cam signal receiving unit 41 receives from the cam angle sensor 330 in the normal state.

The horizontal axis of the timing chart represents the crank angle (CA). FIG. 4 also shows an output signal CRK of the crank angle sensor 316. The output signal CRK of the crank angle sensor 316 exhibits a signal representing passing of the protruding portion 342 every 30 crank angle degrees. Some of the signals representing the passing emerge at an interval of 60 crank angle degrees.

The cam signal receiving unit 41 receives the cam signal CAM from the cam angle sensor 330. The cam signal CAM has a high signal level holding period TH and a low signal level holding period TL. The high signal level holding period TH is a period in which a cam signal having a high signal level H is received. The low signal level holding period TL is a period in which a cam signal having a low signal level L is received. A state in which the voltage is 0 V is included in the state of the low signal level L.

When the main detection object 322 (see FIG. 2(A)) provided in the camshaft 37 faces the cam angle sensor 330, the cam angle sensor 330 outputs a cam signal having the high signal level H. When the sub detection object 323 faces the cam angle sensor 330, the cam angle sensor 330 outputs a cam signal having the low signal level L.

In this embodiment, a signal level representing the main detection object 322 is the high signal level H. A signal level representing the sub detection object 323 is the low signal level L.

The main detection object 322 and the sub detection object 323 occupy the entire periphery, that is, 360 degrees of the camshaft 37. A 360-degree rotation of the camshaft 37 corresponds to a 720-degree rotation of the crankshaft 35. 360 degrees of the camshaft 37 corresponds to 720 crank angle degrees (720 degrees CA).

In this embodiment, the high signal level holding period TH is a main reference period. The low signal level holding period TL is a sub reference period. In a description of this embodiment, the high signal level holding period TH is also referred to as main reference period TH. The low signal level holding period TL is also referred to as sub reference period TL.

The sum of the high signal level holding period TH and the low signal level holding period TL substantially matches a 720-degree rotation of the crankshaft 35. The sum of the main reference period TH and the sub reference period TL substantially matches a 720-degree rotation of the crankshaft 35.

The main detection object 322 is detected by the cam angle sensor 330 during the main reference period TH which corresponds to a period equal to or shorter than 360 crank angle degrees. The main detection object 322 is detected throughout the main reference period TH. The sub detection object 323 is detected by the cam angle sensor 330 during the sub reference period TL which corresponds to a period equal to or longer than 360 crank angle degrees. The sub detection object 323 is detected throughout the sub reference period TL. The main reference period TH corresponds to a period in which the main detection object 322 is detected. The sub reference period TL corresponds to a period in which the sub detection object 323 is detected. The high signal level holding period TH is equal to or shorter than 360 crank angle degrees, and the low signal level holding period TL is equal to or longer than 360 crank angle degrees.

As the crankshaft 35 rotates, the crank angle sensor 316 outputs a signal representing the rotation of the crankshaft 35. The crank angle sensor 316 outputs a signal representing a detection of the crank detection object 341 every 30 (or sometimes 60) crank angle degrees.

In the normal state, as shown in FIG. 4, the high signal level holding period TH and the low signal level holding period TL alternately and continuously appear. The sum of one high signal level holding period TH and one low signal level holding period TL that are continuous with each other substantially matches a period of 720 crank angle degrees or is shorter than the period of 720 crank angle degrees in the engine 30.

In the normal state, the high signal level holding period TH and the low signal level holding period TL alternately and continuously appear. In the high signal level holding period TH, the cam signal CAM having a high signal level is received. In the low signal level holding period TL, the cam signal CAM having a low signal level is received. The sum of one high signal level holding period TH and one low signal level holding period TL that are continuous with each other substantially matches a period of 720 crank angle degrees in the engine.

The diagnosis apparatus 40 receives the cam signal CAM outputted from the cam angle sensor 330, and detects a fault of the cam angle sensor 330.

Figure 5:
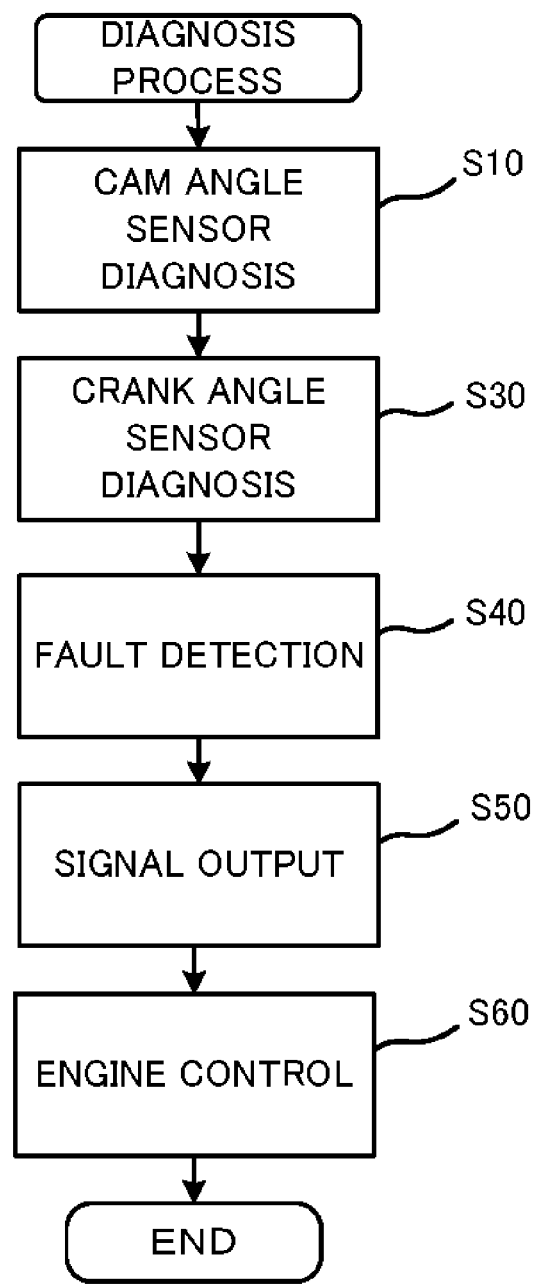
FIG. 5 A flow chart showing a process of the diagnosis apparatus.

FIG. 5 is a flow chart showing a process of the diagnosis apparatus 40.

The diagnosis apparatus 40 performs a cam angle sensor diagnosis (S10), a crank angle sensor diagnosis (S30), a fault detection (S40), a signal output (S50), and an engine control (S60).

Figure 6:
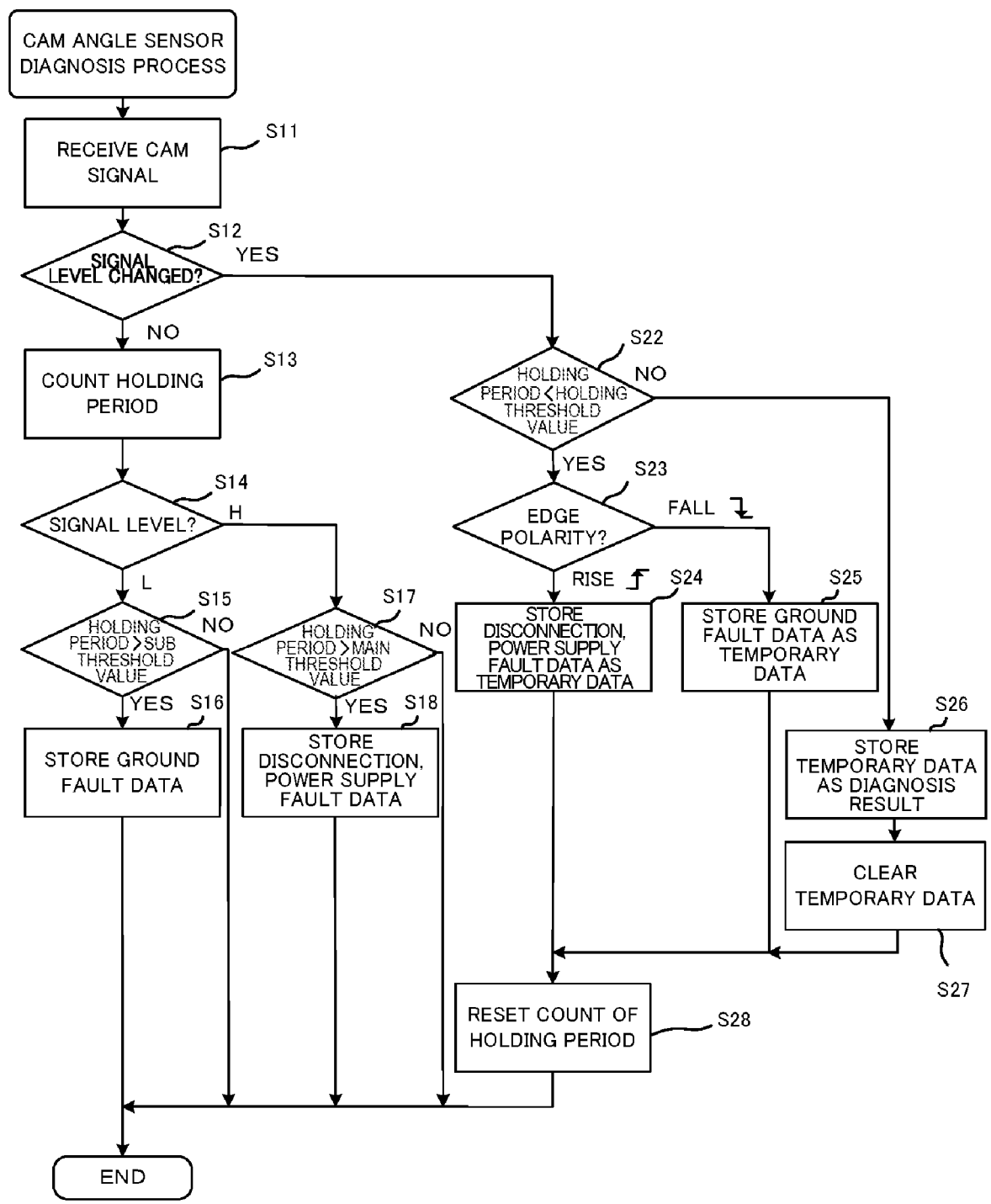
FIG. 6 A flow chart showing a cam angle sensor diagnosis process.

FIG. 6 is a flow chart showing a process of the cam angle sensor diagnosis.

In the cam angle sensor diagnosis process, the diagnosis apparatus 40 detects a fault of the cam angle sensor 330. In the cam angle sensor diagnosis, the diagnosis apparatus 40 determines a type of a fault state of the cam angle sensor 330.

Of the cam angle sensor diagnosis process, steps S11 to S18 will be described first. steps S22 to S28 will be described later.

The cam signal receiving unit 41 receives the cam signal CAM from the cam angle sensor 330 via the signal output line 331 (S11). At this time, the cam signal receiving unit 41 stores a level of the received cam signal CAM.

In subsequent steps S12 to S18, the state determination unit 42 detects a fault state of the cam angle sensor. In addition, the state determination unit 42 determines one or two fault states of the cam angle sensor 330 from the disconnection state, the power supply fault state, and the ground fault state, distinguishably from the other fault states.

The state determination unit 42 determines a signal level (S12). The state determination unit 42 determines whether or not the signal level of the cam signal CAM received by the cam signal receiving unit 41 has changed from the previously determined one. If the signal level has not changed, it means that the signal level is held.

If the determination made in step S12 mentioned above is that the signal level has not changed (S12: No), the state determination unit 42 counts a holding period (S13). The state determination unit 42 counts a period in which the signal level of the cam signal CAM is held. In this manner, a period in which a specific signal level is held is measured.

In this embodiment, the state determination unit 42 measures a signal level holding period based on the signal CRK which corresponds to a rotation cycle of the crankshaft 35 as a reference. The state determination unit 42 measures a signal level holding period in which a signal level of the cam signal CAM is held based on a signal that changes with a cycle equal to or shorter than the rotation cycle of the camshaft 37 as a reference.

In this embodiment, the state determination unit 42 counts a period in which a signal level of the cam signal CAM is held based on the signal CRK outputted from the crank angle sensor 316.

The signal CRK outputted from the crank angle sensor 316 corresponds to the rotation cycle of the crankshaft 35, and changes with a cycle equal to or shorter than the rotation cycle of the camshaft 37. Accordingly, the cam signal CAM is determined precisely. If the signal CRK outputted from the crank angle sensor 316 represents passing of the protruding portion 342 of the crank detection object 341, the state determination unit 42 increments the count of the holding period. The protruding portions 342 are provided at intervals of 30 degrees. Thus, falling of the signal CRK outputted from the crank angle sensor 316 corresponds to a 30-degree rotation of the crankshaft 35. The holding period is counted every 30 degrees of the crankshaft 35. The state determination unit 42 measures a period in units of 30 degrees of the crankshaft 35.

The state determination unit 42 determines the disconnection state and the power supply fault state of the cam angle sensor 330 distinguishably from the rest, that is, the ground fault state, in accordance with a signal level of the cam signal CAM. The state determination unit 42 of this embodiment determines a fault state in accordance with a signal level of the cam signal CAM and an excess of a signal level holding period over the reference periods TH, TL.

The state determination unit 42 makes the determination if a holding period in which the high signal level H is held is at least longer than the main reference period TH, or if a holding period in which the low signal level L is held is at least longer than the sub reference period TL.

More specifically, the state determination unit 42 determines a signal level of the cam signal CAM (S14). The state determination unit 42 determines whether a signal level of the cam signal CAM is the high signal level H or the low signal level L.

If the determination made in step S14 mentioned above is that a signal level is the low signal level L (S14: L), the state determination unit 42 determines whether or not a holding period in which the low signal level L is held is at least longer than the sub reference period TL (S15). The state determination unit 42 determines whether or not the holding period is longer than a sub threshold value Rs. A period that is equal to or longer than the sub reference period TL shown in FIG. 4 is set as the sub threshold value Rs. For example, a value equal to the sub reference period TL is set as the sub threshold value Rs.

If the determination made in step S15 mentioned above is that the holding period is longer than the sub threshold value Rs (S15: Yes), the state determination unit 42 determines that the cam angle sensor 330 is in the ground fault state. The state determination unit 42 determines that the cam angle sensor 330 is in the fault state. At this time, the state determination unit 42 stores ground fault data in the storage unit MEM, the ground fault data representing being in the ground fault state (S16).

If the determination made in step S15 mentioned above is that the holding period is not longer than the sub threshold value Rs (S15: No), the state determination unit 42 terminates the process. In this case, no fault of the cam angle sensor 330 is detected.

If the determination made in step S14 mentioned above is that a signal level is the high signal level H (S14: H), the state determination unit 42 determines whether or not a holding period in which the high signal level H is held is at least longer than the main reference period TH (S17).

More specifically, the state determination unit 42 determines whether or not the holding period is longer than a main threshold value Rm. A period that is equal to or longer than the main reference period TH shown in FIG. 4 is set as the main threshold value Rm. For example, a value equal to the main reference period TH is set as the main threshold value Rm.

If the determination made in step S17 mentioned above is that the holding period is longer than the main threshold value Rm (S17: Yes), the state determination unit 42 determines that the cam angle sensor 330 is in the disconnection state or in the power supply fault state. The state determination unit 42 determines that the cam angle sensor 330 is in the fault state. At this time, the state determination unit 42 stores disconnection, power supply fault data in the storage unit MEM, the disconnection, power supply fault data representing being in the disconnection state or in the power supply fault state (S18).

If the determination made in step S17 mentioned above is that the holding period is not longer than the main threshold value Rm (S17: No), the state determination unit 42 terminates the process. In this case, no fault of the cam angle sensor 330 is detected.

As shown in FIG. 4, the signal level of the cam signal CAM normally repeats the low signal level L and the high signal level H. Accordingly, the state determination unit 42 repeats the determination based on the length of the high signal level holding period TH (S15) and the determination based on the length of the low signal level holding period TL (S17).

Here, the state determination unit 42 makes the determinations so as to satisfy all of the requirements (i) to (iii) below.

(i) The fault state determined based on the length of the high signal level holding period TH and the fault state determined based on the length of the low signal level holding period TL are different from each other. To be specific, the disconnection state or the power supply fault state is determined based on the length of the high signal level holding period TH (S18). The ground fault state is determined based on the length of the low signal level holding period TL (S16).

(ii) The fault state determined based on the length of the high signal level holding period TH is distinguished from a fault state other than the fault state determined based on the length of the high signal level holding period TH. To be specific, the disconnection state or the power supply fault state which is determined based on the length of the high signal level holding period TH is distinguished from a fault state other than both the disconnection state and the power supply fault state, which means the ground fault state.

(iii) The fault state determined based on the length of the low signal level holding period TL is distinguished from a fault state other than the fault state determined based on the length of the low signal level holding period TL. To be specific, the ground fault state which is determined based on the length of the low signal level holding period TL is distinguished from a fault state other than the ground fault state, which means the disconnection state or the power supply fault state.

Through the above-described processing of steps S14 to S18, the state determination unit 42 determines, from the disconnection state, the power supply fault state, and the ground fault state of the cam angle sensor 330, the ground fault state distinguishably from the disconnection state and the power supply fault state, in accordance with the signal level of the cam signal CAM.

In a case where the resistor 48 described with reference to FIG. 3 is provided not between the signal output line 331 and the positive power supply line 40A but between the signal output line 331 and the negative power supply line 40B, the determination is made with distinction different from the above-described distinction. For example, in a case where the resistor 48 is provided between the signal output line 331 and the negative power supply line 40B, the signal level in the disconnection state is substantially equal to the signal level in the ground fault state. In this case, the state determination unit 42 determines the disconnection state and the ground fault state, distinguishably from the rest, that is, the power supply fault state.

In this embodiment, the description will be continuously given about the configuration in which the resistor 48 is provided between the signal output line 331 and the positive power supply line 40A as shown in FIG. 3.

Figure 7A:
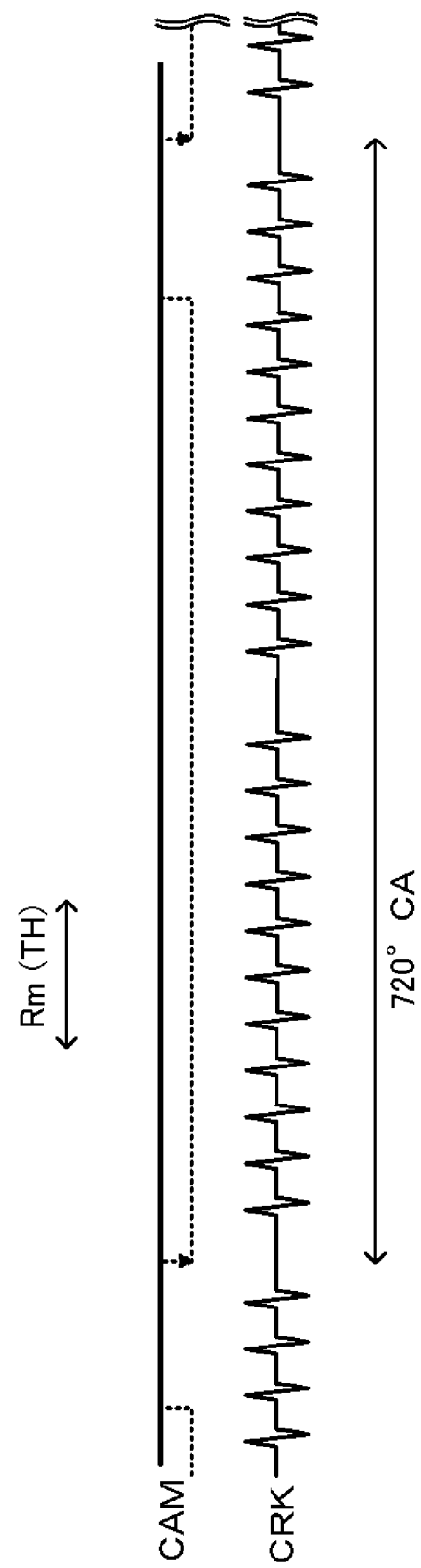
FIG. 7 (A) is a timing chart showing a cam signal that the cam signal receiving unit receives from the cam angle sensor in a power supply fault state or a disconnection state; and (B) is a timing chart showing a cam signal that the cam signal receiving unit receives from the cam angle sensor in a ground fault state.

FIG. 7(A) is a timing chart showing a cam signal CAM that the cam signal receiving unit 41 receives from the cam angle sensor 330 in the power supply fault state or in the disconnection state. The cam signal CAM in the power supply fault state or in the disconnection state is indicated by the solid line.

For example, when isolation between the signal output line 331 and the positive power supply line 40A is degraded in the wiring, the cam angle sensor 330 is likely to come into the power supply fault state or the disconnection state. When the signal output line 331 is disconnected, the cam angle sensor 330 is likely to come into the power supply fault state or the disconnection state.

When the cam angle sensor 330 is in the power supply fault state or in the disconnection state, a determination that a signal level is the high signal level H is made in step S14 mentioned above. In the power supply fault state or the disconnection state, the holding period in which the high signal level H is held is longer than the main threshold value Rm.

The diagnosis apparatus 40 of this embodiment determines the power supply fault state or the disconnection state, by determining that a signal level is the high signal level H and further determining that a holding period in which the high signal level is held is longer than the main reference period TH.

FIG. 7(B) is a timing chart showing a cam signal CAM that the cam signal receiving unit 41 receives from the cam angle sensor 330 in the ground fault state. The cam signal CAM in the ground fault state is indicated by the solid line.

For example, when the signal output line 331 is pinched and pressed to the vehicle body 13 or the like with a strong force, the cam angle sensor 330 may come into the ground fault state.

When the cam angle sensor 330 is in the ground fault state, a determination that a signal level is the low signal level L is made in step S14 mentioned above. In the ground fault state, a holding period in which the low signal level L is held is longer than the sub reference period TL.

The diagnosis apparatus 40 of this embodiment determines the ground fault state distinguishably from the power supply fault state or the disconnection state, by determining that a signal level is the low signal level L and further determining that a holding period in which the low signal level L is held is longer than the sub reference period TL.

The description will continue with reference to FIG. 5 again. The diagnosis apparatus 40 performs the crank angle sensor diagnosis (S30) in addition to the cam angle sensor diagnosis (S10) described above. The crank angle sensor state determination unit 44 of the diagnosis apparatus 40 performs the crank angle sensor diagnosis (S30).

The crank angle sensor state determination unit 44 uses the output signal CRK of the crank angle sensor 316 to diagnose a fault of the crank angle sensor 316. The crank angle sensor state determination unit 44 detects the number of rotations of the crankshaft 35 based on an output signal of the intake pressure sensor 312 as a reference, for example. In a case where the output signal CRK of the crank angle sensor 316 remains unchanged while the crankshaft 35 is rotating, the crank angle sensor state determination unit 44 determines that the crank angle sensor 316 has a fault. For example, in a case where the output signal CRK of the crank angle sensor 316 remains unchanged while the intake pressure sensor 312 outputs the signal representing the intake stroke a plurality of times, the crank angle sensor state determination unit 44 determines that the crank angle sensor 316 has a fault. If a determination that the crank angle sensor 316 has a fault is made, the diagnosis apparatus 40 stores data representing a fault of the crank angle sensor 316.

In the crank angle sensor diagnosis (S30), the crank angle sensor state determination unit 44 does not distinguishably determine the types of faults of the crank angle sensor 316. The crank angle sensor state determination unit 44, however, may distinguishably determine the types of faults of the crank angle sensor 316.

The diagnosis apparatus 40 further performs another fault detection (S40) in addition to the cam angle sensor diagnosis (S10) and the crank angle sensor diagnosis (S30) described above. The diagnosis apparatus 40 detects a fault of a device other than the cam angle sensor 330 and the crank angle sensor 316. If a fault is detected in the cam angle sensor diagnosis, the diagnosis apparatus 40 stores data representing a fault of a device where the fault is detected.

The diagnosis apparatus 40 executes a signal output (S50). To be precise, the signal output unit 43 executes the signal output.

Figure 8:
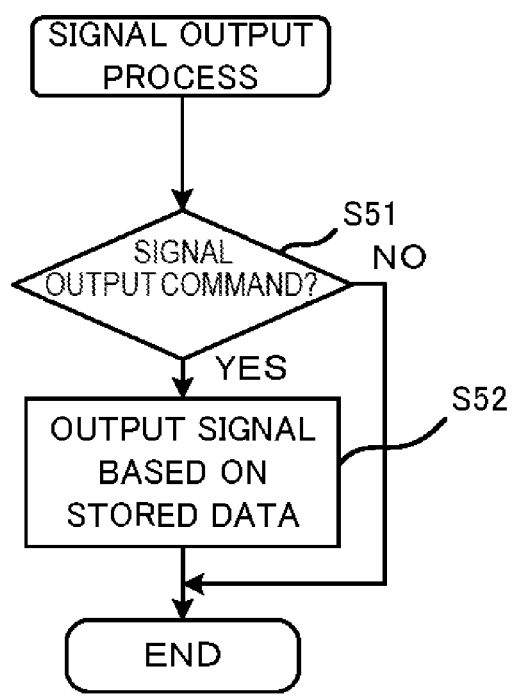
FIG. 8 A flow chart showing a signal output process of the diagnosis apparatus.

FIG. 8 is a flow chart showing a signal output process of the diagnosis apparatus 40.

The signal output unit 43 determines the presence or absence of an input of a signal output command (S51). The signal output command is a command for directing the signal output unit 43 to output a fault signal. The signal output command is outputted to the signal output unit 43 in accordance with an operation. The signal output command is inputted to the signal output unit 43 when, for example, the diagnosis display device 50 is connected to the diagnosis apparatus 40 in accordance with an operation. The signal output command may be inputted to the signal output unit 43 in accordance with an operation performed on the diagnosis display device 50. The signal output unit 43 outputs a signal to the diagnosis display device 50.

If a determination that the signal output command is inputted is made (S51: Yes), the signal output unit 43 outputs a fault signal representing the data stored in the storage unit MEM (S52). The signal output unit 43 outputs the fault signal to the diagnosis display device 50.

In step S52 mentioned above, the signal output unit 43 outputs the fault signal representing a fault state determined by the state determination unit 42. The signal output unit 43 outputs a fault signal representing the ground fault state distinguishably from a fault signal representing the disconnection state and the power supply fault state. A fault signal representing the ground fault state is different from a fault signal representing the disconnection state or the power supply fault state. If data of the ground fault state is stored, the signal output unit 43 outputs a fault signal representing the ground fault state. If data of the disconnection state or the power supply fault state is stored, the signal output unit 43 outputs a fault signal representing the disconnection state or the power supply fault state.

If a fault state other than the ground fault state, the disconnection state, and the power supply fault state is stored, the signal output unit 43 outputs a fault signal in accordance with the stored data.

When outputting a fault signal, the signal output unit 43 performs the output so as to satisfy all of the requirements (I) to (III) below.

(I) A fault signal representing the fault state determined based on the length of the high signal level holding period TH and a fault signal representing the fault state determined based on the length of the low signal level holding period TL are different from each other. To be specific, a fault signal representing the disconnection state or the power supply fault state which is determined based on the length of the high signal level holding period TH is different from a fault signal representing the ground fault state which is determined based on the length of the low signal level holding period TL.

(II) The fault signal representing the fault state determined based on the length of the high signal level holding period TH is distinguished from a fault signal representing a fault state other than the fault state determined based on the length of the high signal level holding period TH. To be specific, the fault signal representing the disconnection state or the power supply fault state which is determined based on the length of the high signal level holding period TH is distinguished from a fault signal representing a fault state other than both the disconnection state and the power supply fault state, which means the ground fault state.

(III) The fault signal representing the fault state determined based on the length of the low signal level holding period TL is distinguished from a fault signal representing a fault state other than the fault state determined based on the length of the low signal level holding period TL. To be specific, the fault signal representing the ground fault state which is determined based on the length of the low signal level holding period TL is distinguished from a fault signal representing a fault state other than the ground fault state, which means the disconnection state or the power supply fault state.

After the signal output unit 43 outputs a fault signal to the diagnosis display device 50, the diagnosis display device 50 displays information based on the fault state of the cam angle sensor 330. The diagnosis display device 50 performs the display in such a manner that the ground fault state, and the disconnection or power supply fault state are recognized distinguishably from each other.

A user or a repairer of the straddled vehicle V recognizes a fault of the cam angle sensor 330 by referring to the information displayed by the diagnosis display device 50. The user or the repairer can narrow down where a cause of the function fault of the cam angle sensor 330 is. Accordingly, the user or the repairer can guess a location of failure, for inspection and repair.

The diagnosis apparatus 40 may output the fault signal to a device that is mounted to the vehicle body 13 and different from the diagnosis display device 50. For example, the diagnosis apparatus 40 may output the fault signal to a display device (not shown) supported on the vehicle body 13. In this case, the display device displays the ground fault state, and the disconnection or power supply fault state distinguishably from each other.

The description will continue with reference to FIG. 5 again. The diagnosis apparatus 40 executes the engine control (S60). The engine control unit 45 controls an operation of the engine 30 based on an output signal of the crank angle sensor 316. The engine control unit 45 controls an operation of the engine 30 based on an output signal of the crank angle sensor 316 and an output signal of the cam angle sensor 330. The engine control unit 45 controls a timing when the fuel injection device 306 injects the fuel and a timing when ignition is performed by the spark plug 38.

The engine control unit 45 also uses an output of a sensor other than the crank angle sensor 316 and the cam angle sensor 330, for controlling the engine 30. For example, the engine control unit 45 uses output signals of the intake pressure sensor 312 and the engine temperature sensor 317.

Returning to FIG. 6, a case where the diagnosis apparatus 40 diagnoses a fault state that emerges intermittently will be described.

If the determination made in step S12 of FIG. 6 is that the signal level of the cam signal has changed (S12: Yes), the state determination unit 42 executes processing of steps S22 to S28.

In the processing of steps S22 to S28, a fault state that emerges intermittently is detected.

If the determination is that the signal level has changed (S12: Yes), the state determination unit 42 determines whether or not a holding period in which the signal level was held until the change is a period shorter than a holding threshold value Pmin (S22). As the holding threshold value Pmin, a period shorter than the main reference period TH (see FIG. 4) is set.

That is, in step S12, the state determination unit 42 determines whether or not the signal level has changed twice or more in a period having the holding threshold value Pmin which is shorter than the main reference period TH.

If the determination is that the signal level has changed twice or more in the holding threshold value period (S22: Yes), the state determination unit 42 determines an edge polarity of the change (S23). In a case where the signal level after the change is a high signal level, the edge polarity is a rising edge. In a case where the signal level after the change is a low signal level, the edge polarity is a falling edge.

If the determination made in step S23 mentioned above is the rising edge (S23: RISE), the state determination unit 42 stores disconnection, power supply fault data as temporary data in the storage unit MEM, the disconnection, power supply fault data representing being in the disconnection state or in the power supply fault state (S24).

If the determination made in step S23 mentioned above is the falling edge (S23: FALL), the state determination unit 42 stores ground fault data as temporary data in the storage unit MEM, the ground fault data representing being in the ground fault state (S25). The temporary data is overwritten in steps S25, S24.

If the holding period is equal to or longer than the holding threshold value Pmin (S22: No), the state determination unit 42 stores, as a diagnosis result, the temporary data stored in the storage unit MEM (S26). In a case where the stored temporary data is the disconnection, power supply fault data, data representing an intermittent disconnection, power supply fault is stored as the diagnosis result. In a case where the stored temporary data is the ground fault data, data representing an intermittent ground fault is stored as the diagnosis result. Then, the state determination unit 42 clears the temporary data (S27).

In the signal output process shown in FIG. 8, a signal based on the data stored as the diagnosis result is outputted (S52). The signal output unit 43 of the diagnosis apparatus 40 outputs a signal representing an intermittent fault state, distinguishably from a signal of a non-intermittent fault state. The signal output unit 43 outputs a fault signal representing an intermittent ground fault state, distinguishably from a fault signal representing an intermittent disconnection state and an intermittent power supply fault state.

After steps S24, S25, and S27 of FIG. 6, the state determination unit 42 resets the count of the holding period (S28). Therefore, after the signal level has changed, counting of a holding period (S13) starts.

FIG. 9(A) is a timing chart schematically showing a cam signal in an intermittent ground fault state.

The intermittent ground fault state occurs when, for example, the signal output line 331 and the negative power supply line (ground line) 40B are not completely insulated from each other. The intermittent ground fault state is a state in which, for example, the signal output line 331 and the ground line 40B instantaneously come into contact due to vibrations.

In the intermittent ground fault state, the cam signal CAM is forced to be the low level signal at a moment when a ground fault state occurs. As a result, as shown in FIG. 9(A), the intermittent ground fault state occurs in a period though the high level signal is normally supposed to emerge in the period.

The state determination unit 42 determines whether or not the signal level has changed twice or more in the period having the holding threshold value Pmin which is shorter than the main reference period TH. The state determination unit 42 determines whether or not the signal level has changed after the previous change of the signal level in the period represented by the holding threshold value Pmin (S22 of FIG. 6).

In FIG. 9(A), "S" represents that the signal level changes in the period having the holding threshold value Pmin and the state determination unit 42 determines the edge polarity to be a falling edge (FIG. 6, S23: FALL). In this case, the state determination unit 42 stores ground fault data as temporary data.

"O" represents that the signal level changes in the period having the holding threshold value Pmin and the state determination unit 42 determines the edge polarity to be a rising edge (FIG. 6, S23: RISE). In this case, the state determination unit 42 stores disconnection, power supply fault data as temporary data.

"R" represents that the signal level does not change within the period having the holding threshold value Pmin. In this case, the state determination unit 42 stores, as a diagnosis result, the data that has been stored as the temporary data.

In a case of occurrence of the intermittent ground fault state, as shown in FIG. 9(A), a period having the low level signal occurs in a part of the period that is normally supposed to have the high level signal. The low level signal period occurs intermittently.

At the falling edge (the position "S"), the state determination unit 42 stores the ground fault data as temporary data. At the rising edge (the position "O"), the state determination unit 42 stores the disconnection, power supply fault data as temporary data. The temporary data is overwritten. In an exemplary signal shown in FIG. 9(A), the ground fault data is eventually stored as the diagnosis result (the position "R").

FIG. 9(B) is a timing chart schematically showing a cam signal in an intermittent power supply fault state or disconnection state.

In a case of occurrence of the intermittent power supply fault state or disconnection state, as shown in FIG. 9(B), a period having the high level signal occurs in a part of the period that is normally supposed to have the low level signal. The high level signal period occurs intermittently.

At the rising edge (the position "O"), the state determination unit 42 stores the disconnection, power supply fault data as temporary data. At the falling edge (the position "S"), the state determination unit 42 stores the ground fault data as temporary data. The temporary data is overwritten. In an exemplary signal shown in FIG. 9(A), the disconnection, power supply fault data is eventually stored as the diagnosis result (the position "R").

The signal output unit 43 outputs a signal to the diagnosis display device 50, the signal being in accordance with the data stored as the eventual diagnosis result in the storage unit MEM (S51, S52 of FIG. 8). Information of the intermittent fault state that is in accordance with the output signal is outputted to the diagnosis display device 50.

As thus far described, the state determination unit 42 of this embodiment performs a determination also when the signal level has changed twice or more in the period that is at least shorter than the main reference period.

The phenomenon of an intermittent fault is likely to emerge in advance of a steady fault. Thus, the state determination unit 42 of this embodiment can detect a fault state of the cam angle sensor 330 at an early stage. This embodiment enables a fault place to be guessed at an early stage.

In the embodiment described above, the value equal to the main reference period TH is set as the main threshold value Rm, and the value equal to the sub reference period TL is set as the sub threshold value Rs.

For the determination of a fault state, the main threshold value Rm may be a period longer than the main reference period TH. The sub threshold value Rs may be a period longer than the sub reference period TL.

For example, a crank angle range greater than the main reference period TH may be set as the main threshold value Rm. For example, an angle range corresponding to one rotation or a plurality of rotations of the crankshaft 35 may be set as the main threshold value Rm. For example, a crank angle range greater than the sub reference period TL may be set as the sub threshold value Rs. For example, an angle range corresponding to one rotation or a plurality of rotations of the crankshaft 35 may be set as the sub threshold value Rs.

It however should be noted that shortening the value of the main threshold value Rm and/or the sub threshold value Rs enables early-stage detection of a fault state.

Second Embodiment

In the first embodiment described above, a period in which the signal level of the cam signal CAM is held is counted based on the signal CRK outputted from the crank angle sensor 316 as a reference. A second embodiment will now be described in which a signal level holding period is measured based on an output signal of the intake pressure sensor 312 as a reference. Differences from the first embodiment will be mainly described with reference to the drawings that have been referred to in the first embodiment.

In this embodiment, the state determination unit 42 uses the output signal of the intake pressure sensor 312 (see FIG. 2) instead of the output signal of the crank angle sensor 316.

The output signal of the intake pressure sensor 312 represents the intake stroke. The output signal of the intake pressure sensor 312 varies along with the crank angle. In the intake stroke, the intake pressure sensor 312 outputs a signal representing a pressure drop. In the output signal of the intake pressure sensor 312, a period from a signal representing a pressure drop to a signal representing a next pressure drop corresponds to two rotations of the crankshaft 35. Thus, a period in units of two rotations of the crankshaft 35 is counted based on the output signal of the intake pressure sensor 312.

In this embodiment, the period corresponding to two rotations of the crankshaft 35 is set as the main threshold value Rm. For example, a period from when the intake pressure sensor 312 outputs a signal representing a pressure drop to when the intake pressure sensor 312 outputs a signal representing the next pressure drop is set as the main threshold value Rm. The period corresponding to two rotations of the crankshaft 35 is set as the sub threshold value Rs. For example, a period from when the intake pressure sensor 312 outputs a signal representing a pressure drop to when the intake pressure sensor 312 outputs a signal representing the next pressure drop is set as the sub threshold value Rs.

Alternatively, a period longer than the period corresponding to two rotations of the crankshaft 35 may be set as the main threshold value Rm or the sub threshold value Rs. In addition, the period having the main threshold value Rm may be different from the period having the sub threshold value Rs.

In step S13 shown in FIG. 6, the state determination unit 42 counts a holding period at a time when an output of a signal representing a pressure drop starts.

If the determination made in step S14 is that the signal level is the low signal level L (S14: L), the state determination unit 42 determines whether or not a holding period in which the low signal level L is held is longer than the sub threshold value Rs (S15). The state determination unit 42 determines whether or not the count of the holding period is greater than one. If the determination made in step S15 is that the holding period is longer than the sub threshold value Rs (S15: Yes), it means that the holding period in which the low signal level L is held is longer than the period corresponding to two rotations of the crankshaft 35. In this case, the holding period in which the low signal level L is held is at least longer than the sub reference period TL. In this case, the state determination unit 42 determines that the cam angle sensor 330 is in the ground fault state.

If the determination made in step S14 is that the signal level is the high signal level H (S14: H), the state determination unit 42 determines whether or not a holding period in which the high signal level H is held is longer than the main threshold value Rm (S17). The state determination unit 42 determines whether or not the count of the holding period is greater than one. If the determination made in step S17 is that the holding period is longer than the main threshold value Rm (S17: Yes), the holding period in which the high signal level H is held is at least longer than the main reference period TH. In this case, the state determination unit 42 determines that the cam angle sensor 330 is in the disconnection state or in the power supply fault state.

The output signal of the intake pressure sensor 312 corresponds to the rotation cycle of the crankshaft 35 of the engine 30, and changes with a cycle equal to or shorter than the rotation cycle of the camshaft 37. Accordingly, the determination of the fault state of the cam angle sensor 330 is made precisely.

In this embodiment, the processing of steps S22 to S28 shown in FIG. 6 is omitted. As for the holding period determined in step S22, however, the measurement can be made based on the output signal of the crank angle sensor 316. In such a case, the processing of steps S22 to S28 shown in FIG. 6 may be maintained.

Except for the configuration described above, this embodiment has the same configuration as that of the first embodiment.

In this embodiment, the output signal of the intake pressure sensor 312 can be used to determine a fault state of the cam angle sensor. Thus, the configuration for measuring the holding period based on the crank angle as a reference is simple.

In the first embodiment and the second embodiment described above, the holding period based on the crank angle as a reference is measured. The holding period, however, may be based on information other than the crank angle as a reference. For example, the holding period may be measured based on the rotation angle of a starter motor for starting the engine as a reference. Alternatively, the holding period may be measured based on a time elapse as a reference.

The same value may be set as the main threshold value Rm and the sub threshold value Rs for determining a signal holding period in which the cam signal is held.

In the embodiments described above, as for the cam signal, the signal level representing the main detection object 322 is the high level H. A cam signal output logic, however, may be reverse to that of the embodiments described above. For example, the signal level representing the main detection object may be the low signal level L.

In the embodiments described above, the signal output line 331 is connected to the power supply line 40A via the resistor 48. For example, a signal output line may be connected to an output terminal provided in an input/output unit via a resistor. For example, a state determination unit changes the output level of the output terminal between the high level and the low level. For example, the state determination unit may determine that the cam angle sensor is in the disconnection state, if the level of the signal output line follows the output level of the output terminal.

The signal level for the determination of the cam signal is not limited to the high level signal and the low level signal. For example, both a resistor connected to a positive power supply and a resistor connected to a negative power supply may be connected to a signal output line of a cam angle sensor. In this configuration, the signal level in the disconnection state is a voltage between the value of the high level signal and the value of the low level signal. For example, a configuration in which the cam signal receiving unit 41 has an A/D converter and determines a voltage between the high level signal and the low level signal can determine the disconnection state distinguishably from the power supply fault state and the ground fault states. This configuration can also determine a fault state without measuring the holding period.

The diagnosis apparatus may be provided with a circuit other than the computer, for determining a fault state. For example, the A/D converter mentioned above may be provided outside the computer. A determination circuit for determining a fault state may be provided outside the computer.

In the embodiments described above, the sum of one high signal level holding period TH and one low signal level holding period TL that are adjacent to each other substantially matches a 720-degree rotation of the crankshaft 35. Instead, a set of the high signal level holding period and the low signal level holding period may occur a plurality of times during a 720-degree rotation of the crankshaft. For example, the detection object part may include a plurality of main detection objects and a plurality of sub detection objects.

The straddled vehicle is not limited to motorcycles, but may be motor tricycles, ATVs (All-Terrain Vehicles), snowmobiles, and the like.

It should be understood that the terms and expressions used in the above embodiments are for descriptions and not to be construed in a limited manner, do not eliminate any equivalents of features shown and mentioned herein, and allow various modifications falling within the claimed scope of the present invention. The present invention may be embodied in many different forms. The present disclosure is to be considered as providing embodiments of the principles of the invention. The embodiments are described herein with the understanding that such embodiments are not intended to limit the invention to preferred embodiments described herein and/or illustrated herein. The embodiments described herein are not limiting. The present invention includes any and all embodiments having equivalent elements, modifications, omissions, combinations, adaptations and/or alterations as would be appreciated by those in the art based on the present disclosure. The limitations in the claims are to be interpreted broadly based on the language employed in the claims and not limited to embodiments described in the present specification or during the prosecution of the present application. The present invention is to be interpreted broadly based on the language employed in the claims.

REFERENCE SIGNS LIST

V straddled vehicle
20 engine system
30 engine
37 camshaft
40 cam angle sensor fault diagnosis apparatus for straddled vehicle
41 cam signal receiving unit
42 state determination unit
44 crank angle sensor state determination unit
43 signal output unit
312 intake pressure sensor
316 crank angle sensor
317 engine temperature sensor
322 main detection object
323 sub detection object
330 cam angle sensor
331 signal output line
TH high signal level holding period (main reference period)
TL low signal level holding period (sub reference period)

The invention claimed is:

1. A cam angle sensor fault diagnosis apparatus for a straddled vehicle, the cam angle sensor fault diagnosis apparatus configured to detect a fault of a cam angle sensor, the cam angle sensor configured to detect a rotation angle of a camshaft provided in an engine of the straddled vehicle, the cam angle sensor fault diagnosis apparatus for the straddled vehicle comprising:

a cam signal receiving unit connected to a signal output line through a cam signal in accordance with the rotation angle of the camshaft is output by the cam angle sensor;

a state determination unit configured to determine one or two fault states of the cam angle sensor from among a disconnection state, a power supply fault state, and a ground fault state, distinguishably from the other fault states, based on a signal level of the cam signal received by the cam signal receiving unit, and based on a holding period, in which the signal level is held; and a signal output unit configured to output a fault signal representing the one or two fault states determined by the state determination unit, in such a manner that the fault signal representing the one or two fault states is different from a fault signal representing the other fault states.

2. The cam angle sensor fault diagnosis apparatus for the straddled vehicle according to claim 1, wherein the state determination unit determines the one or two fault states of the cam angle sensor from the disconnection state, the power supply fault state, and the ground fault state, distinguishably from the other fault states, based on the signal level of the cam signal received by the cam signal receiving unit and based on the holding period, in which the signal level is held, exceeding a reference period defined for each of the signal levels.

3. The cam angle sensor fault diagnosis apparatus for the straddled vehicle according to claim 2, wherein the camshaft is provided with a main detection object and a sub detection object, the main detection object being detected by the cam angle sensor in a main reference period corresponding to a period equal to or shorter than 360 crank angle degrees out of 720 crank angle degrees of the engine, the sub detection object being detected by the cam angle sensor in a sub reference period corresponding to a period equal to or longer than 360 crank angle degrees out of the 720 crank angle degrees, and a holding period in which the signal level representing the main detection object is held is at least longer than the main reference period, or where a holding period in which the signal level representing the sub detection object is held is at least longer than the sub reference period, the state determination unit determines the one or two fault states of the cam angle sensor from the disconnection state, the power supply fault state, and the ground fault state, distinguishably from the other fault states.

4. The cam angle sensor fault diagnosis apparatus for the straddled vehicle according to claim 3, wherein in a case either where the holding period in which the signal level representing the main detection object is held is at least longer than the main reference period, or where the holding period in which the signal level representing the sub detection object is held is at least longer than the sub reference period, the state determination unit determines the one or two fault states of the cam angle sensor from the disconnection state, the power supply fault state, and the ground fault state, distinguishably from the other fault states, and in a case where the signal level of the cam signal has changed twice or more in a period that is at least shorter than the main reference period, the state determination unit determines the one or two fault states of the cam angle sensor from the disconnection state, the power supply fault state, and the ground fault state, distinguishably from the other fault states.

5. The cam angle sensor fault diagnosis apparatus for the straddled vehicle according to any one of claims 2 to 4, wherein the state determination unit measures the holding period in which the signal level is held based on a signal that corresponds to a rotation cycle of a crankshaft of the engine and that changes with a cycle equal to or shorter than a rotation cycle of the camshaft as a reference.

6. The cam angle sensor fault diagnosis apparatus for the straddled vehicle according to claim 5, wherein the state determination unit measures the holding period in which the signal level is held based on an output signal of a crank angle sensor that detects a rotation angle of the crankshaft as a reference.

7. The cam angle sensor fault diagnosis apparatus for the straddled vehicle according to claim 5, wherein the state determination unit measures the holding period in which the signal level is held based on an output signal of an intake pressure sensor that detects an intake pressure of the engine as a reference.

8. The cam angle sensor fault diagnosis apparatus for the straddled vehicle according to claim 1, wherein when the cam angle sensor is not in any of the disconnection state, the power supply fault state, and the ground fault state, the cam signal receiving unit receives the cam signal from the cam angle sensor such that a high signal level holding period in which the cam signal having a high signal level is received and a low signal level holding period in which the cam signal having a low signal level is received alternately and continuously appear and such that the sum of one high signal level holding period and one low signal level holding period that are continuous with each other substantially matches a period of 720 crank angle degrees in the engine or is shorter than the period of 720 crank angle degrees, in the high signal level holding period and the low signal level holding period that alternately and continuously appear, the state determination unit repeats a determination of a fault state based on the length of the high signal level holding period and a determination of a fault state based on the length of the low signal level holding period so as to satisfy all of requirements (i) to (iii) that: (i) a fault state determined based on the length of the high signal level holding period and a fault state determined based on the length of the low signal level holding period are different from each other; (ii) a fault state determined based on the length of the high signal level holding period is distinguished from a fault state other than the fault state determined based on the length of the high signal level holding period; and (iii) a fault state determined based on the length of the low signal level holding period is distinguished from a fault state other than the fault state determined based on the length of the low signal level holding period, and the signal output unit outputs the fault signal so as to satisfy all of requirements (I) to (III) that: (I) the fault signal representing the fault state determined based on the length of the high signal level holding period and the fault signal representing the fault state determined based on the length of the low signal level holding period are different from each other; (II) the fault signal representing the fault state determined based on the length of the high signal level holding period is distinguished from the fault signal representing the fault state other than the fault state determined based on the length of the high signal level holding period; and (III) the fault signal representing the fault state determined based on the length of the low signal level holding period is distinguished from the fault signal representing the fault state other than the fault state determined based on the length of the low signal level holding period.

9. An engine system installed in a straddled vehicle, the engine system comprising:
   an engine;
   a cam angle sensor that detects a rotation angle of a camshaft provided in the engine; and
   the cam angle sensor fault diagnosis apparatus according to claim 1.

10. A straddled vehicle comprising the engine system according to claim 9.

* * * * *